US012775413B2

(12) United States Patent
Ji et al.

(10) Patent No.: US 12,775,413 B2
(45) Date of Patent: Oct. 27, 2026

(54) STORAGE DEVICE RESETTING, DEPENDING ON TEMPERATURE, WEIGHT FOR INCREASE IN READ COUNT AND OPERATING METHOD THEREOF

(71) Applicant: SK hynix Inc., Gyeonggi-do (KR)

(72) Inventors: Seung Gu Ji, Gyeonggi-do (KR); Dong Jae Shin, Gyeonggi-do (KR); Hyung Min Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 11 days.

(21) Appl. No.: 18/830,581

(22) Filed: Sep. 11, 2024

(65) Prior Publication Data

US 2025/0362829 A1 Nov. 27, 2025

(30) Foreign Application Priority Data

May 21, 2024 (KR) ........................ 10-2024-0065510

(51) Int. Cl.
*G06F 3/06* (2006.01)

(52) U.S. Cl.
CPC .......... *G06F 3/0653* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 11,768,615 | B1 * | 9/2023 | Zhou | G11C 11/40626 711/170 |
| 2016/0034189 | A1 * | 2/2016 | Kim | G06F 3/061 711/103 |
| 2018/0059948 | A1 * | 3/2018 | Lee | G06F 12/0238 |
| 2019/0004723 | A1 * | 1/2019 | Li | G06F 1/3296 |
| 2020/0411110 | A1 * | 12/2020 | Getreuer | G11C 16/0483 |
| 2021/0149564 | A1 * | 5/2021 | Luo | G06F 3/0616 |
| 2023/0244287 | A1 | 8/2023 | Li | |

FOREIGN PATENT DOCUMENTS

KR 10-2012-0056424 A 6/2012

* cited by examiner

*Primary Examiner* — Jared I Rutz
*Assistant Examiner* — Alexander J Yoon
(74) *Attorney, Agent, or Firm* — IP&T GROUP LLP

(57) ABSTRACT

A storage device includes a memory, a controller, a first temperature sensor and a second temperature sensor. The storage device determines whether a preset weight reset condition is satisfied, based on at least one of the temperature of the memory measured from the first temperature sensor and the temperature of the controller measured from the second temperature sensor, and resets a weight for an increase in read count for data when it is determined that the weight reset condition is satisfied.

16 Claims, 10 Drawing Sheets

FIG.8

TEMP_PGM

| temperature range | W1 |
|---|---|
| TR1 | VAL_1 |
| TR2 | VAL_2 |
| TR3 | VAL_3 |

VAL_1 > VAL_2
VAL_3 > VAL_2

FIG.9

TEMP_RD

| temperature range | W2 |
|---|---|
| TR1 | VAL_1 |
| TR2 | VAL_2 |
| TR3 | VAL_3 |

VAL_1 > VAL_2
VAL_3 > VAL_2

STORAGE DEVICE RESETTING, DEPENDING ON TEMPERATURE, WEIGHT FOR INCREASE IN READ COUNT AND OPERATING METHOD THEREOF

CROSS-REFERENCE TO RELATED APPLICATION

The present application claims priority under 35 U.S.C. § 119(a) to Korean Patent Application No. 10-2024-0065510 filed on May 21, 2024, which is incorporated herein by reference in its entirety.

BACKGROUND

1. Technical Field

Embodiments of the present disclosure relate to a storage device which resets, depending on temperature, a weight for an increase in read count, and an operating method thereof.

2. Related Art

A storage device is a device for storing data according to a request from an external device such as a computer, a mobile terminal (e.g., a smart phone or tablet), or the like.

A storage device may include a memory for storing data therein and a controller for controlling the memory. The memory may be a volatile memory or a non-volatile memory. The controller may receive a command from an external device (i.e., a host), and execute or control operations to read, write, or erase data in the memory according to the received command.

The storage device may be used in various environments, and due to this fact, may operate at various temperatures. When the storage device operates according to an existing reliability standard in a high or low temperature environment, the likelihood of failing to meet requirements may increase.

SUMMARY

Various embodiments of the present disclosure are directed to providing a storage device capable of operating with high reliability in a high or low temperature environment, and an operating method thereof.

Embodiments of the present disclosure may provide a storage device including a memory configured to store data; a controller configured to control the memory; a first temperature sensor configured to measure the temperature of the memory; and a second temperature sensor configured to measure the temperature of the controller. The controller may determine whether a preset weight reset condition is satisfied, based on at least one of the temperature of the memory and the temperature of the controller. When it is determined that the weight reset condition is satisfied, the controller may reset a weight for an increase in read count for the data.

Embodiments of the present disclosure also may provide a method for operating a storage device including obtaining the temperature of a memory from a first temperature sensor which measures the temperature of the memory in which data is stored; obtaining the temperature of a controller from a second temperature sensor which measures the temperature of the controller; determining whether a preset weight reset condition is satisfied, based on at least one of the temperature of the memory and the temperature of the controller; and resetting a weight for an increase in read count for the data when it is determined that the weight reset condition is satisfied.

According to the embodiments of the present disclosure, a storage device may operate with high reliability in a high or low temperature environment.

BRIEF DESCRIPTION OF THE DRAWINGS

FIG. 8 is a diagram showing an operation in which the storage device according to the embodiment of the present disclosure determines a first weight.

FIG. 9 is a diagram showing an operation in which the storage device according to the embodiment of the present disclosure determines a second weight.

DETAILED DESCRIPTION

Figure 1:
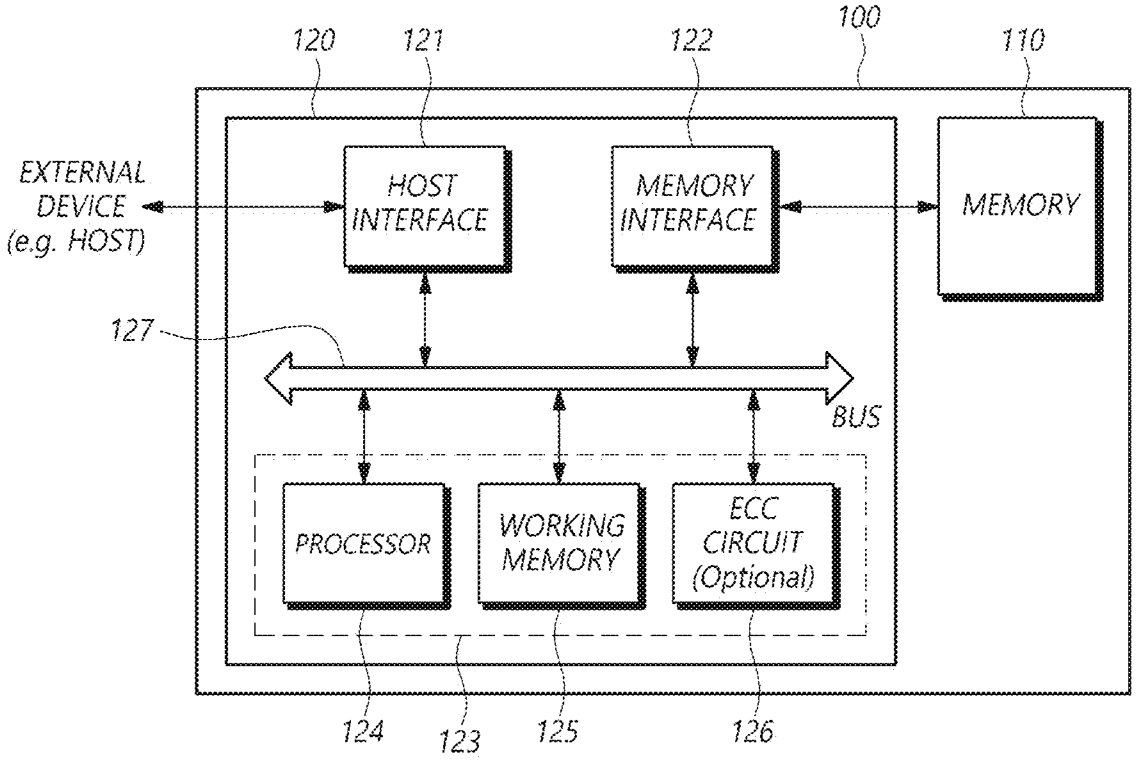
FIG. 1 is a schematic configuration diagram of a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily limited to the same embodiment(s). The term "embodiments" when used herein does not necessarily refer to all embodiments.

Various embodiments of the present disclosure are described below in more detail with reference to the accompanying drawings. However, the present disclosure may be embodied in different forms and variations, and should not be construed as being limited to the embodiments set forth herein. Rather, the described embodiments are provided so that this disclosure will be thorough and complete, and will fully convey the embodiments of the present disclosure to those skilled in the art to which this disclosure pertains. Throughout the disclosure, like reference numerals refer to like parts throughout the various figures and embodiments of the present disclosure.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a schematic configuration diagram of a storage device 100 according to an embodiment of the disclosure.

Referring to FIG. 1, the storage device 100 may include a memory 110 that stores data and a controller 120 that controls the memory 110.

The memory 110 includes a plurality of memory blocks, and operates in response to the control of the controller 120. Operations of the memory 110 may include, for example, a read operation, a program operation (also referred to as a write operation) and an erase operation.

The memory 110 may include a memory cell array including a plurality of memory cells (also simply referred to as "cells") that store data.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. The memory 110 may perform an operation indicated by the command, on the area selected by the address.

The memory 110 may perform a program operation, a read operation or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (program), read, erase and background operations for the memory 110. For example, background operations may include at least one of a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples. Alternatively, the host may be a virtual reality (VR) device providing 2D or 3D virtual reality images or an augmented reality (AR) device providing augmented reality images. The host may be any of various electronic devices that require the storage device 100 capable of storing data.

The host may include at least one operating system (OS). The operating system may generally manage and control the function and operation of the host, and may control interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in description, the controller 120 and the host as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one of various communication interfaces or standards such as a USB (universal serial bus) protocol, an MMC (multimedia card) protocol, a PCI (peripheral component interconnection) protocol, a PCI-e or PCIe (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is, the memory interface 122 may be configured to provide an interface between the memory 110 and the controller 120 in response to the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic operation. The processor 124 may communicate with the host through the host interface 121, and may communicate with the memory 110 through the memory interface 122.

The processor 124 may execute logical operations required to perform the function of a flash translation layer (FTL). The processor 124 may translate a logical block address (LBA), provided by the host, into a physical block address (PBA) through the flash translation layer. The flash translation layer may receive the logical block address and translate the logical block address into the physical block address, by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic operation, the processor 124 may execute (drive) firmware loaded in the working memory 125 upon booting. Hereafter, an operation of the storage device 100 according to embodiments of the present disclosure will be described as implementing the processor 124 that executes firmware in which the corresponding operation is defined.

Firmware is a program to be executed in the storage device 100 to drive the storage device 100 and may include various functional layers. For example, the firmware may include binary data in which codes for executing the functional layers, respectively, are defined.

For example, the firmware may include at least one of a flash translation layer, a host interface layer (HIL), and a flash interface layer (FIL). The flash translation layer performs a translating function between a logical address requested to the storage device 100 from the host and a physical address of the memory 110. The host interface layer serves to analyze a command requested to the storage device 100 as a storage device from the host and transfers the command to the flash translation layer. The flash interface layer transfers a command, instructed from the flash translation layer, to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic operation, which is defined in the firmware loaded in the working memory 125, to control the general operation of the controller 120. The processor 124 may store a result of performing the logic operation defined in the firmware, in the working memory 125. The processor 124 may control the controller 120 according to a result of performing the logic operation defined in the firmware such that the controller 120 generates a command or a signal. When a part of firmware, in which a logic operation to be performed is defined, is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata is data for managing the memory 110 and may include, for example, management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command and data. The working memory 125 may be a volatile memory that includes, for example, at least one of an SRAM (static RAM), a DRAM (dynamic RAM) and an SDRAM (synchronous DRAM). The controller 120 may additionally use a separate volatile memory (e.g., SRAM, DRAM) located outside the controller 120 in addition to the working memory 125.

The error detection and correction circuit 126 may detect an error bit of target data, and correct the detected error bit by using an error correction code. The target data may be, for example, data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of the read data, when each read data is constituted by a plurality of sectors. A sector may mean a data unit that is smaller than a page, which is the read unit of a flash memory. Sectors constituting each read data may be matched with one another using an address.

The error detection and correction circuit 126 may calculate a bit error rate (BER), and may determine whether an error is correctable or not, by sector units. For example, when a bit error rate is greater than a reference value, the error detection and correction circuit 126 may determine that a corresponding sector is uncorrectable or a fail. On the other hand, when a bit error rate is less than the reference value, the error detection and correction circuit 126 may determine that a corresponding sector is correctable or a pass.

The error detection and correction circuit 126 may perform an error detection and correction operation sequentially for all read data. In the case where a sector included in read data is correctable, the error detection and correction circuit 126 may omit an error detection and correction operation for a corresponding sector for next read data. If the error detection and correction operation for all read data is ended in this way, then the error detection and correction circuit 126 may detect a sector which is uncorrectable in read data last. There may be one or more sectors that are determined to be uncorrectable. The error detection and correction circuit 126 may transfer information (e.g., address information) regarding a sector which is determined to be uncorrectable to the processor 124.

A bus 127 may be configured to provide channels among the components 121, 122, 124, 125 and 126 of the controller 120. The bus 127 may include, for example, a control bus for transferring various 1*o* control signals, commands and the like, a data bus for transferring various data, and so forth.

Some components among the above-described components 121, 122, 124, 125 and 126 of the controller 120 may be omitted, or some components among the above-described components 121, 122, 124, 125 and 126 of the controller 120 may be integrated into one component. In addition to the above-described components 121, 122, 124, 125 and 126 of the controller 120, one or more other components may be added.

Hereinbelow, the memory 110 will be described in further detail with reference to FIG. 2.

Figure 2:
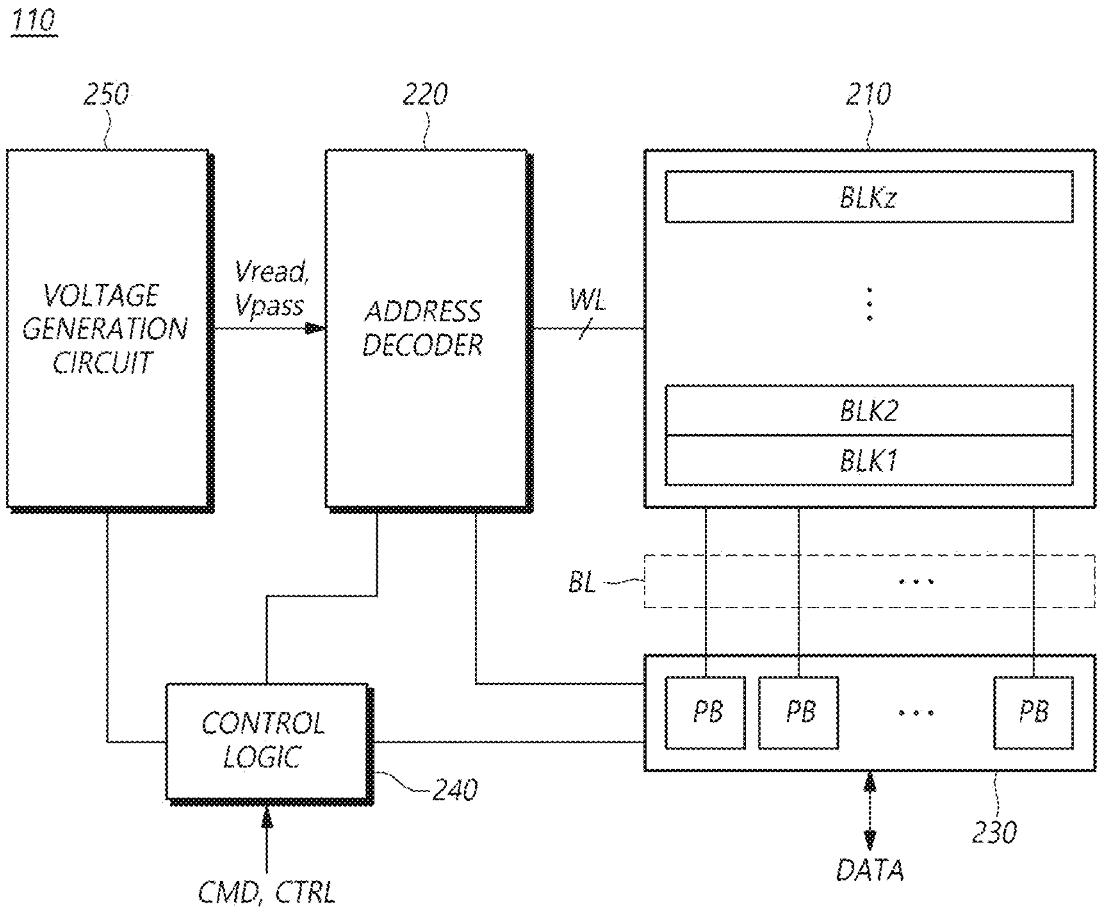
FIG. 2 is a block diagram schematically illustrating a memory of FIG. 1.

FIG. 2 is a block diagram schematically illustrating a memory 110 of FIG. 1.

Referring to FIG. 2, the memory 110 according to an embodiment of the present disclosure may include a memory cell array 210, an address decoder 220, a read and write circuit 230, a control logic 240, and a voltage generation circuit 250.

The memory cell array 210 may include a plurality of memory blocks BLK1 to BLKz, where z is a natural number of 2 or greater.

In the plurality of memory blocks BLK1 to BLKz, a plurality of word lines WL and a plurality of bit lines BL may be disposed, and a plurality of memory cells may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may be configured by nonvolatile memory cells that have vertical channel structures.

The memory cell array 210 may be configured by a memory cell array of a two-dimensional structure or may be configured by a memory cell array of a three-dimensional structure.

Each of the plurality of memory cells included in the memory cell array 210 may store at least 1-bit data. For instance, each of the plurality of memory cells included in the memory cell array 210 may be a single level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined. For example, a single-level cell that stores 1-bit data may be changed to a triple-level cell that stores 3-bit data.

Referring to FIG. 2, the address decoder 220, the read and write circuit 230, the control logic 240 and the voltage generation circuit 250 may operate as a peripheral circuit that drives the memory cell array 210.

The address decoder 220 may be coupled to the memory cell array 210 through the plurality of word lines WL.

The address decoder 220 may be configured to operate in response to the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

During a read operation, the address decoder 220 may apply the read voltage Vread to a selected word line WL in a selected memory block, and may apply the pass voltage Vpass to the remaining unselected word lines WL.

In a program verify operation, the address decoder 220 may apply a verify voltage generated in the voltage generation circuit 250 to a selected word line WL in a selected memory block, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one of a block address, a row address and a column address.

The address decoder 220 may select one memory block and one word line depending on a block address and a row address. A column address may be decoded by the address decoder 220 and be provided to the read and write circuit 230.

The address decoder 220 may include at least one of a block decoder, a row decoder, a column decoder and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. In a read operation and a program verify operation, the plurality of page buffers PB may continuously supply sensing current to bit lines BL coupled with memory cells to sense threshold voltages (Vth) of the memory cells, and may latch sensing data by sensing, through sensing nodes, changes in the amounts of current flowing, depending on the programmed states of the corresponding memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230 and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal outputted from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. In another example, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first select line (also referred to as a source select line or a drain select line) may be additionally disposed outside a first outermost word line more adjacent to the read and write circuit 230 between two outermost word lines, and a second select line (also referred to as a drain select line or a source select line) may be additionally disposed outside a second outermost word line between the two outermost word lines.

At least one dummy word line may be additionally disposed between the first outermost word line and the first select line. At least one dummy word line may also be additionally disposed between the second outermost word line and the second select line.

A read operation and a program operation (write operation) of the memory block described above may be performed by the unit of a page, and an erase operation may be performed by the unit of a memory block.

Figure 3:
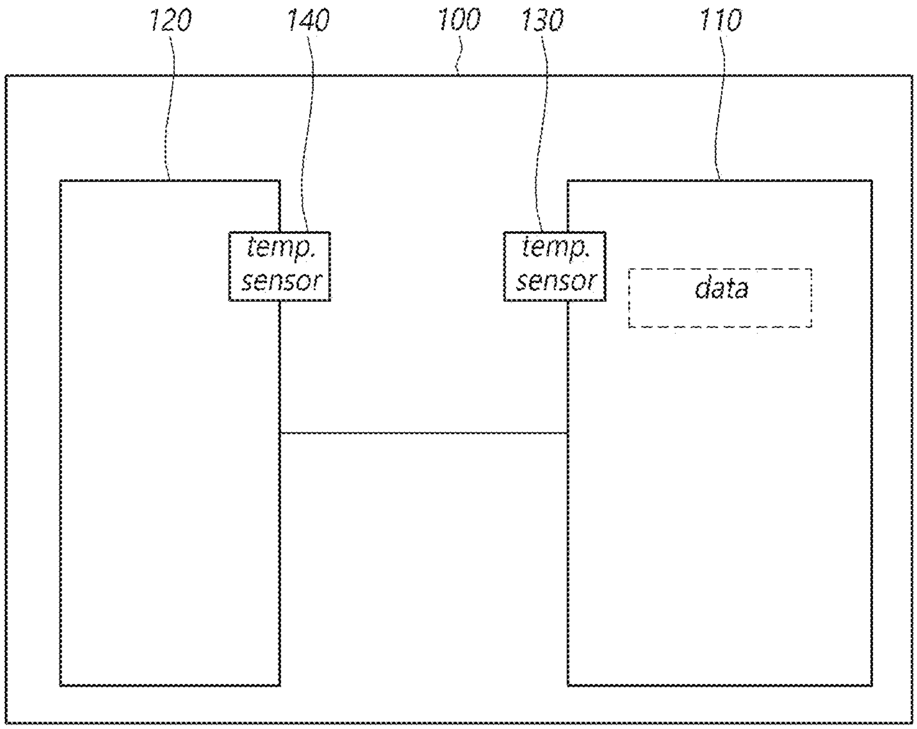
FIG. 3 is a diagram showing the schematic structure of a storage device according to an embodiment of the present disclosure.

FIG. 3 is a diagram showing the schematic structure of a storage device 100 according to an embodiment of the present disclosure.

Referring to FIG. 3, the storage device 100 may include a memory 110, a controller 120, a first temperature sensor 130 and a second temperature sensor 140.

The memory 110 may store data.

The controller 120 may control the memory 110. The controller 120 may read data from the memory 110, and may write data to the memory 110.

The first temperature sensor 130 may measure the temperature of the memory 110. The first temperature sensor 130 may be located inside or outside the memory 110.

The second temperature sensor 140 may measure the temperature of the controller 120. The second temperature sensor 140 may be located inside or outside the controller 120.

Figure 4:
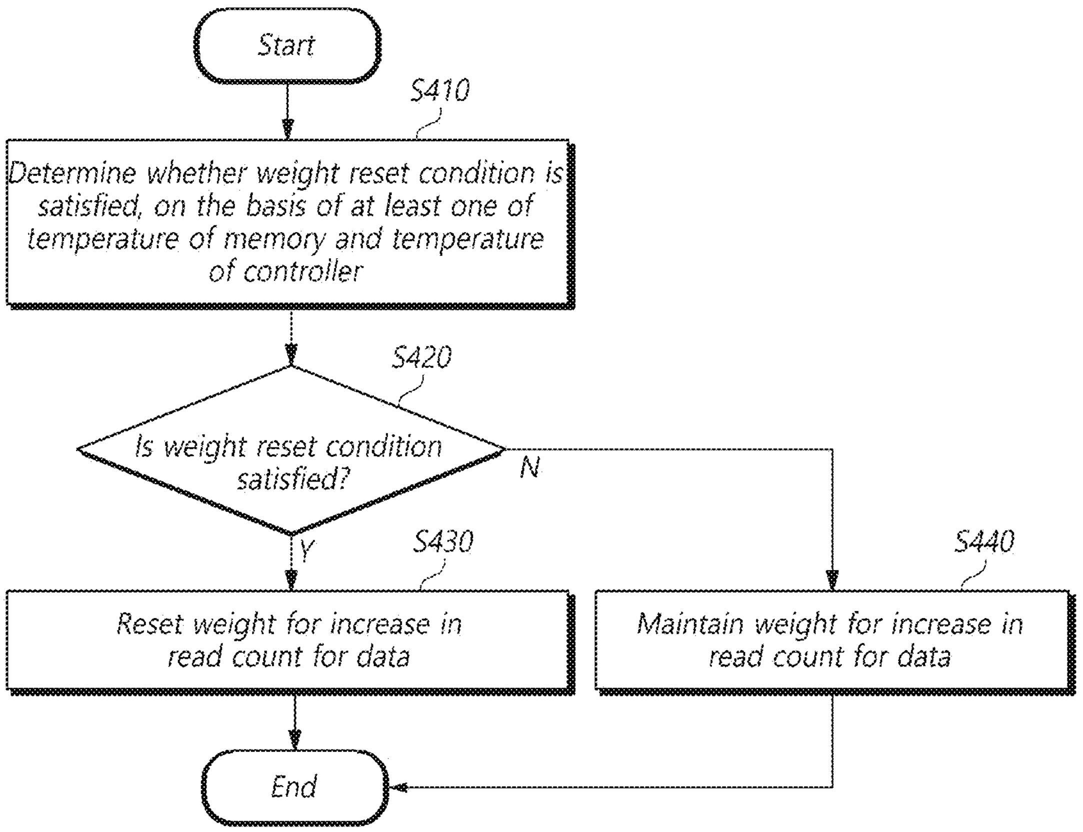
FIG. 4 is a flowchart showing a schematic operation of the storage device according to the embodiment of the present disclosure.

FIG. 4 is a flowchart showing a schematic operation of the storage device 100 according to the embodiment of the present disclosure.

Referring to FIG. 4, the controller 120 of the storage device may determine whether a preset weight reset condition is satisfied, based on at least one of the temperature of the memory 110 measured from the first temperature sensor 130 and the temperature of the controller 120 measured from the second temperature sensor 140 (S410). This will be described in detail with reference to FIG. 5.

When it is determined that the weight reset condition is satisfied (S420—Y), the controller 120 may reset a weight for an increase in read count for data stored in the memory 110 (S430).

On the other hand, when it is determined that the weight reset condition is not satisfied (S420—N), the controller 120 may maintain a weight for an increase in read count for data stored in the memory 110 as it is (S440).

A weight for an increase in read count for data represents a rate at which a read count for data increases when a read operation on data is performed. The higher a weight is, the greater an increase in read count for data is when the same number of read operations are performed on the data.

The controller 120 may determine an operation (e.g., read reclaim) to be performed to satisfy reliability for data, based on a read count for data. For example, when a read count for data is greater than or equal to a threshold count, the controller 120 may perform a read reclaim operation for the data.

Therefore, as a read count for data increases faster, an operation to be performed to satisfy reliability for data may be performed more frequently. Through this, the controller 120 may ensure high reliability for data.

Figure 5:
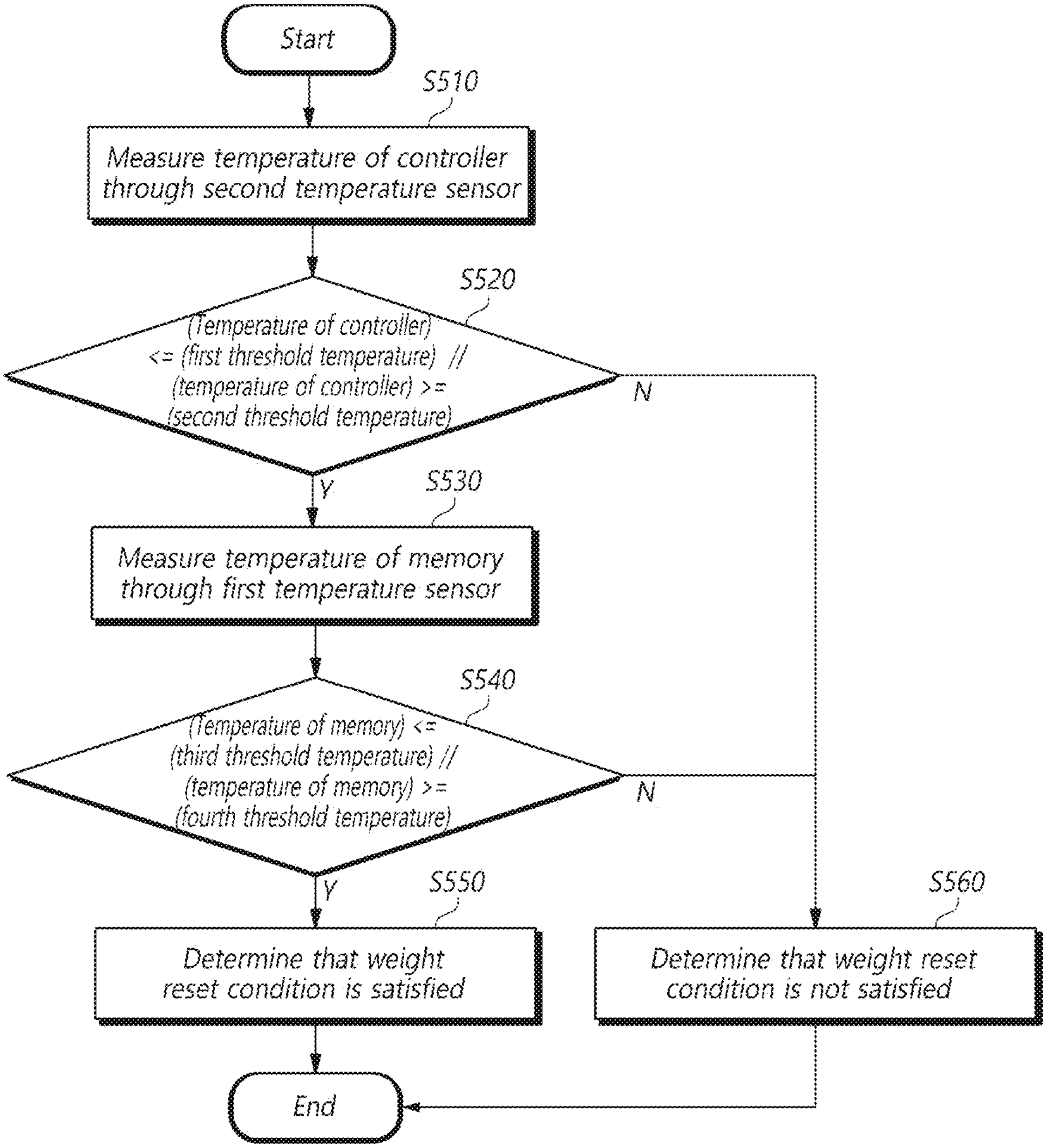
FIG. 5 is a flowchart showing an operation in which the storage device according to the embodiment of the present disclosure determines whether a weight reset condition is satisfied.

FIG. 5 is a flowchart showing an operation in which the storage device 100 according to the embodiment of the present disclosure determines whether a weight reset condition is satisfied.

Referring to FIG. 5, the controller 120 of the storage device may measure the temperature of the controller 120 through the second temperature sensor 140 (S510).

A time point at which the controller 120 measures the temperature of the controller 120 may be determined as follows.

For example, the controller 120 may periodically measure the temperature of the controller 120 according to a preset period.

For another example, the controller 120 may measure the temperature of the controller 120 when reading data stored in the memory 110.

The controller 120 determines whether the temperature of the controller 120 is less than or equal to a first threshold temperature, or is greater than or equal to a second threshold temperature (S520). In some embodiments, the first threshold temperature is less than the second threshold temperature.

When it is determined that the temperature of the controller 120 is greater than the first threshold temperature, and is less than the second threshold temperature (S520—N), the controller 120 determines that the weight reset condition is not satisfied (S560). In this case, the controller 120 determines that there is no need to reset a weight because the temperature of the controller 120 is within a normal range.

When it is determined that the temperature of the controller 120 is less than or equal to the first threshold temperature or is greater than or equal to the second threshold temperature (S520—Y), the controller 120 may measure the temperature of the memory 110 through the first temperature sensor 130 to check a more accurate temperature condition (S530).

The controller 120 determines whether the temperature of the memory 110 is less than or equal to a third threshold temperature or is greater than or equal to a fourth threshold temperature (S540). In some embodiments, the third threshold temperature is less than the fourth threshold temperature.

When it is determined that the temperature of the memory 110 is less than or equal to the third threshold temperature or is greater than or equal to the fourth threshold temperature (S540—Y), the controller 120 determines that the weight reset condition is satisfied (S550). In this case, the controller 120 determines that a weight needs to be reset because the temperature of the memory 110 is outside a normal range.

On the other hand, when it is determined that the temperature of the memory 110 is greater than the third threshold temperature, and is less than the fourth threshold temperature (S540—N), the controller 120 determines that the weight reset condition is not satisfied (S560).

The third threshold temperature may be less than the first threshold temperature, and the fourth threshold temperature may be greater than the second threshold temperature.

In the above, the operation in which the storage device 100 determines whether the weight reset condition is satisfied has been described.

Hereinafter, an operation in which the storage device 100 resets a weight when the weight reset condition is satisfied will be described.

Figure 6:
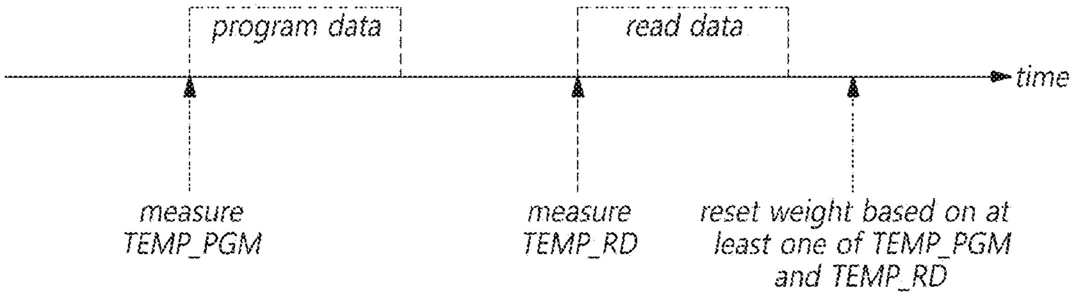
FIG. 6 is a diagram showing an operation in which the storage device according to the embodiment of the present disclosure resets a weight.

FIG. 6 is a diagram showing an operation in which the storage device 100 according to the embodiment of the present disclosure resets a weight.

Referring to FIG. 6, the controller 120 of the storage device may reset a weight for an increase in read count for data based on at least one of a program temperature TEMP_PGM and a read temperature TEMP_RD.

The program temperature TEMP_PGM is the temperature of the memory 110 measured at a time point of programming data to the memory 110.

The read temperature TEMP_RD is the temperature of the memory 110 measured at a time point of reading data from the memory 110.

Figure 7:
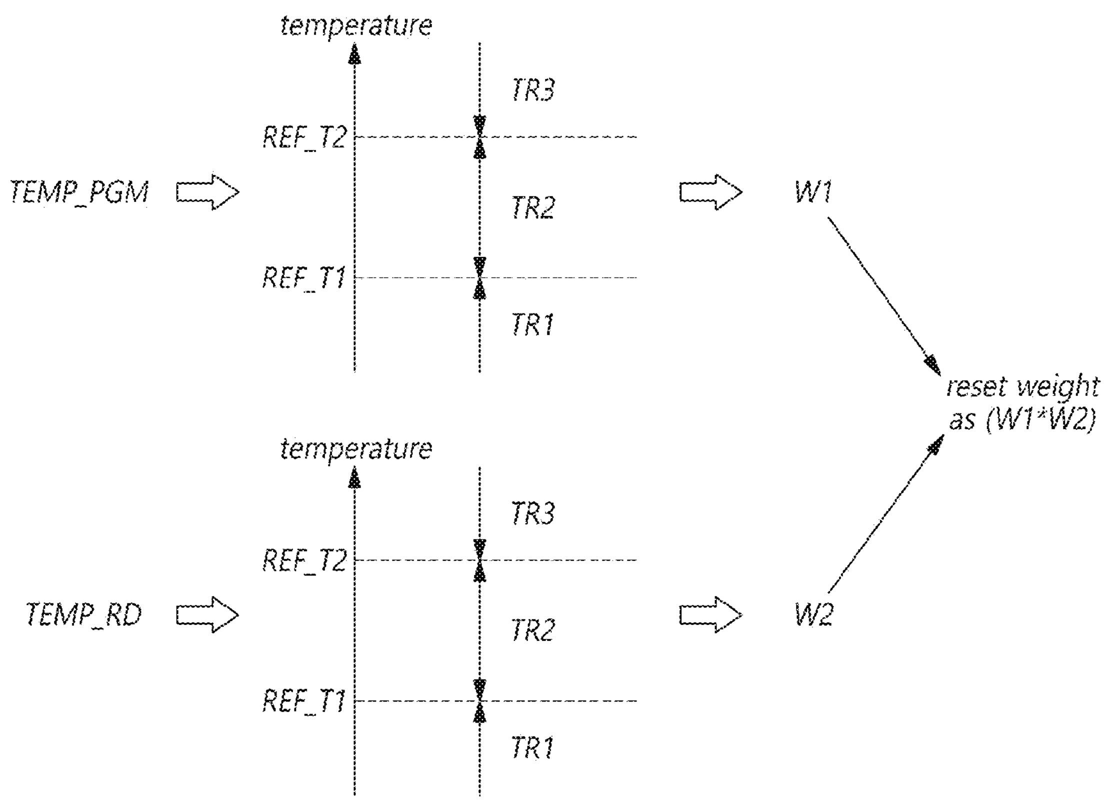
FIG. 7 is a diagram showing an operation in which the storage device according to the embodiment of the present disclosure resets a weight using a first weight and a second weight.

FIG. 7 is a diagram showing an operation in which the storage device 100 according to the embodiment of the present disclosure resets a weight for an increase in read count for data using a first weight W1 and a second weight W2.

Referring to FIG. 7, the controller 120 of the storage device may determine the first weight W1 based on a temperature range to which the program temperature TEMP_PGM belongs among a first temperature range TR1, a second temperature range TR2 and a third temperature range TR3 that are preset.

The controller 120 may determine the second weight W2 based on a temperature range to which the read temperature TEMP_RD belongs among the first temperature range TR1, the second temperature range TR2 and the third temperature range TR3.

A temperature less than a first reference temperature REF_T1 may belong to the first temperature range TR1. A temperature greater than or equal to the first reference temperature REF_T1 and less than a second reference temperature REF_T2 may belong to the second temperature range TR2. A temperature greater than or equal to the second reference temperature REF_T2 may belong to the third temperature range TR3. That is, the first temperature range TR1 may be a low temperature range, the second temperature range TR2 may be a room temperature range, and the third temperature range TR3 may be a high temperature range.

The controller 120 may reset a weight for an increase in read count for data as the product of the first weight W1 and the second weight W2.

In FIG. 7, the first weight W1 may be determined as one of three values depending on the program temperature TEMP_PGM, and the second weight W2 may be determined as one of three values depending on the read temperature TEMP_RD. As a result, a weight may be reset to one of 3*3=9 values.

Hereinafter, an operation in which the storage device 100 determines the first weight W1 and the second weight W2 will be described.

FIG. 8 is a diagram showing an operation in which the storage device 100 according to the embodiment of the present disclosure determines the first weight W1.

Referring to FIG. 8, the controller 120 of the storage device may determine the first weight W1 as a first value VAL_1 when the program temperature TEMP_PGM belongs to the first temperature range TR1. The controller 120 may determine the first weight W1 as a second value VAL_2 when the program temperature TEMP_PGM belongs to the second temperature range TR2. The controller 120 may determine the first weight W1 as a third value VAL_3 when the program temperature TEMP_PGM belongs to the third temperature range TR3.

The relationship between the magnitudes of the first value VAL_1, the second value VAL_2 and the third value VAL_3 may be defined in various ways.

For example, the first value VAL_1 and the third value VAL_3 may be greater than the second value VAL_2. The first weight W1 applied when the program temperature TEMP_PGM is a low temperature or a high temperature is greater than the first weight W1 applied when the program temperature TEMP_PGM is a room temperature.

In some embodiments, the first value VAL_1 may be greater than the third value VAL_3. In other embodiments, the first value VAL_1 may be less than the third value VAL_3.

FIG. 9 is a diagram showing an operation in which the storage device 100 according to the embodiment of the present disclosure determines the second weight W2.

Referring to FIG. 9, the controller 120 of the storage device may determine the second weight W2 as a first value VAL_1 when the read temperature TEMP_RD belongs to the first temperature range TR1. The controller 120 may determine the second weight W2 as a second value VAL_2 when the read temperature TEMP_RD belongs to the second temperature range TR2. The controller 120 may determine the second weight W2 as a third value VAL_3 when the read temperature TEMP_RD belongs to the third temperature range TR3.

The relationship between the magnitudes of the first value VAL_1, the second value VAL_2 and the third value VAL_3 may be defined in various ways.

For example, the first value VAL_1 and the third value VAL_3 may be greater than the second value VAL_2. The second weight W2 applied when the read temperature TEMP_RD is a low temperature or a high temperature is greater than the second weight W2 applied when the read temperature TEMP_RD is a room temperature.

In some embodiments, the first value VAL_1 may be greater than the third value VAL_3. In other embodiments, the first value VAL_1 may be less than the third value VAL_3.

Figure 10:
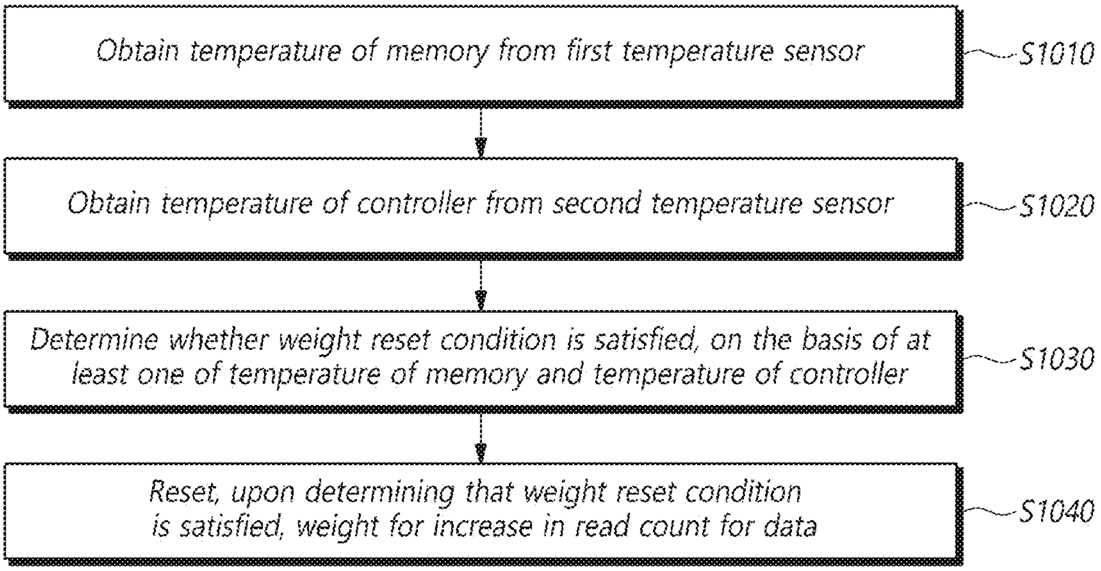
FIG. 10 is a flowchart showing a method for operating a storage device according to an embodiment of the present disclosure.

FIG. 10 is a flowchart showing a method for operating the storage device 100 according to an embodiment of the present disclosure.

Referring to FIG. 10, the method for operating the storage device 100 may include S1010 of obtaining the temperature of the memory 110 from the first temperature sensor 130 which measures the temperature of the memory 110 in which data is stored.

The method for operating the storage device 100 may include S1020 of obtaining the temperature of the controller 120 from the second temperature sensor 140 which measures the temperature of the controller 120 which controls the memory 110.

The method for operating the storage device 100 may include S1030 of determining whether a preset weight reset condition is satisfied, based on at least one of the temperature of the memory 110 and the temperature of the controller 120.

For example, in the S1030, when the temperature of the controller 120 is less than or equal to a first threshold temperature or is greater than or equal to a second threshold temperature, and the temperature of the memory 110 is less than or equal to a third threshold temperature or is greater than or equal to a fourth threshold temperature, it may be determined that the weight reset condition is satisfied. The first threshold temperature is less than the second threshold temperature, and the third threshold temperature is less than the fourth threshold temperature.

The third threshold temperature may be less than the first threshold temperature, and the fourth threshold temperature may be greater than the second threshold temperature.

The method for operating the storage device 100 may include S1040 of resetting a weight for an increase in read count for data stored in the memory 110 when it is determined that the weight reset condition is satisfied.

For example, in the S1040, the weight for an increase in read count for data stored in the memory 110 may be reset based on at least one of the program temperature TEMP_PGM as the temperature of the memory 110 measured at a time point when data is programmed to the memory 110, and the read temperature TEMP_RD as the temperature of the memory 110 measured at a time point when data is read from the memory 110.

For example, the S1040 may include determining the first weight W1 based on a temperature range to which the program temperature TEMP_PGM belongs among the first temperature range TR1, the second temperature range TR2 and the third temperature range TR3 that are preset; determining the second weight W2 based on a temperature range to which the read temperature TEMP_RD belongs among the first temperature range TR1, the second temperature range TR2 and the third temperature range TR3; and resetting the weight as the product of the first weight W1 and the second weight W2.

A temperature belonging to the first temperature range TR1 is less than the first reference temperature REF_T1. A temperature belonging to the second temperature range TR2 is greater than or equal to the first reference temperature REF_T1 and less than the second reference temperature REF_T2. A temperature belonging to the third temperature range TR3 is greater than or equal to the second reference temperature REF_T2.

In determining the first weight W1, the first weight W1 may be determined as the first value VAL_1 when the program temperature TEMP_PGM belongs to the first temperature range TR1. The first weight W1 may be determined as the second value VAL_2 when the program temperature TEMP_PGM belongs to the second temperature range TR2. The first weight W1 may be determined as the third value VAL_3 when the program temperature TEMP_PGM belongs to the third temperature range TR3. The first value VAL_1 and the third value VAL_3 are greater than the second value VAL_2.

In determining the second weight W2, the second weight W2 may be determined as the first value VAL_1 when the read temperature TEMP_RD belongs to the first temperature range TR1. The second weight W2 may be determined as the second value VAL_2 when the read temperature TEMP_RD belongs to the second temperature range TR2. The second weight W2 may be determined as the third value VAL_3 when the read temperature TEMP_RD belongs to the third temperature range TR3. The first value VAL_1 and the third value VAL_3 are greater than the second value VAL_2.

Although various embodiments of the present disclosure have been described for illustrative purposes, those skilled in the art will appreciate that various modifications, additions and substitutions are possible, without departing from the scope and spirit of the present disclosure. Therefore, the embodiments disclosed above and in the accompanying drawings should be considered in a descriptive sense only and not for limiting the technological scope. The technological scope of the present disclosure is not limited by the embodiments and the accompanying drawings. The spirit and scope of the present disclosure should be interpreted in connection with the appended claims and encompass all equivalents falling within the scope of the appended claims. Furthermore, the claims may be combined to form additional embodiments.

What is claimed is:

1. A storage device comprising: a memory configured to store data; a controller configured to control the memory; a first temperature sensor configured to measure a first temperature of the memory; and a second temperature sensor configured to measure a second the temperature of the controller, wherein the controller determines whether a preset condition comprising a weight reset condition is satisfied, based on at least one of the first temperature of the memory and the second temperature of the controller, wherein, in response to determining that the weight reset condition is satisfied, the controller resets a weight for an increase in read count for the data, and wherein the controller determines that the weight reset condition is satisfied in response to measuring the second temperature of the controller as less than or equal to a first threshold temperature or is greater than or equal to a second threshold temperature and measuring the first temperature of the memory as less than or equal to a third threshold temperature or is greater than or equal to a fourth threshold temperature, the first threshold temperature is less than the second threshold temperature, the third threshold temperature is less than the fourth threshold temperature, the third threshold temperature is less than the first threshold temperature, and the fourth threshold temperature is greater than the second threshold temperature.

2. The storage device according to claim 1, wherein the controller resets the weight based on at least one of a program temperature as the first temperature of the memory measured at a first time point when the data is programmed to the memory and a read temperature as the first temperature of the memory measured at a second time point when the data is read from the memory.

3. The storage device according to claim 2, wherein the controller determines a first weight based on a temperature range to which the program temperature belongs among a first temperature range, a second temperature range and a third temperature range that are preset, the controller determines a second weight based on a temperature range to which the read temperature belongs among the first temperature range, the second temperature range and the third temperature range, the controller resets the weight as a product (A*B) of the first weight A and the second weight B, a temperature belonging to the first temperature range is less than a first reference temperature, a temperature belonging to the second temperature range is greater than or equal to the first reference temperature and less than a second reference temperature, and a temperature belonging to the third temperature range is greater than or equal to the second reference temperature.

4. The storage device according to claim 3, wherein the controller determines the first weight as a first value when the program temperature belongs to the first temperature range, the controller determines the first weight as a second value when the program temperature belongs to the second temperature range, the controller determines the first weight as a third value when the program temperature belongs to the third temperature range, and the first value and the third value are greater than the second value.

5. The storage device according to claim 3, wherein the controller determines the second weight as a first value when the read temperature belongs to the first temperature range, the controller determines the second weight as a second value when the read temperature belongs to the second temperature range, the controller determines the second weight as a third value when the read temperature belongs to the third temperature range, and the first value and the third value are greater than the second value.

6. The storage device according to claim 1, wherein when it is determined that the weight reset condition is not satisfied, the controller maintains the weight.

7. The storage device according to claim 6, wherein the controller performs a read reclaim operation on the data based on the maintained weight or the reset weight.

8. The storage device according to claim 7, wherein the read reclaim operation is performed when a read count for the maintained weight or the reset weight is greater than or equal to a threshold count.

9. A method for operating a storage device, the method comprising: obtaining a first temperature of a memory from a first temperature sensor which measures the first temperature of the memory in which data is stored; obtaining a second temperature of a controller from a second temperature sensor which measures the second temperature of the controller; determining whether a preset condition comprising a weight reset condition is satisfied, based on at least one of the first temperature of the memory and the second temperature of the controller; and resetting a weight for an increase in read count for the data in response to determining that the weight reset condition is satisfied, wherein the determining whether the weight reset condition is satisfied includes determining that the weight reset condition is satisfied in response to measuring the second temperature of the controller as less than or equal to a first threshold temperature or is greater than or equal to a second threshold temperature and measuring the first temperature of the memory as less than or equal to a third threshold temperature or is greater than or equal to a fourth threshold temperature, the first threshold temperature is less than the second threshold temperature, the third threshold temperature is less than the fourth threshold temperature, the third threshold temperature is less than the first threshold temperature, and the fourth threshold temperature is greater than the second threshold temperature.

10. The method according to claim 9, wherein the resetting a weight includes resetting the weight based on at least one of a program temperature as the first temperature of the memory measured at a first time point when the data is programmed to the memory and a read temperature as the first temperature of the memory measured at a second time point when the data is read from the memory.

11. The method according to claim 10, wherein the resetting a weight comprises:

determining a first weight based on a temperature range to which the program temperature belongs among a first temperature range, a second temperature range and a third temperature range that are preset;

determining a second weight based on a temperature range to which the read temperature belongs among the first temperature range, the second temperature range and the third temperature range; and resetting the weight as a product (A*B) of the first weight A and the second weight B, wherein a temperature belonging to the first temperature range is less than a first reference temperature, wherein a temperature belonging to the second temperature range is greater than or equal to the first reference temperature and less than a second reference temperature, and wherein a temperature belonging to the third temperature range is greater than or equal to the second reference temperature.

12. The method according to claim 11, wherein the determining a first weight determines the first weight as a first value when the program temperature belongs to the first temperature range, the determining a first weight determines the first weight as a second value when the program temperature belongs to the second temperature range, the determining a first weight determines the first weight as a third value when the program temperature belongs to the third temperature range, and the first value and the third value are greater than the second value.

13. The method according to claim 11, wherein the determining a second weight determines the second weight as a first value when the read temperature belongs to the first temperature range, the determining a second weight determines the second weight as a second value when the read temperature belongs to the second temperature range, the determining a second weight determines the second weight as a third value when the read temperature belongs to the third temperature range, and the first value and the third value are greater than the second value.

14. The method according to claim 9, further comprising: maintaining the weight when it is determined that the weight reset condition is not satisfied.

15. The method according to claim 14, further comprising: performing a read reclaim operation on the data based on the maintained weight or the reset weight.

16. The method according to claim 15, wherein the performing the read reclaim operation includes performing the read reclaim operation when a read count for the maintained weight or the reset weight is greater than or equal to a threshold count.

* * * * *